US006512965B2

United States Patent
Osawa

(10) Patent No.: US 6,512,965 B2
(45) Date of Patent: Jan. 28, 2003

(54) ROBOT AND CONTROL METHOD FOR ENTERTAINMENT

(75) Inventor: Hiroshi Osawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/024,952

(22) Filed: Dec. 19, 2001

(65) Prior Publication Data

US 2002/0049515 A1 Apr. 25, 2002

Related U.S. Application Data

(63) Continuation of application No. 09/743,301, filed on Apr. 9, 2001, now abandoned.

(30) Foreign Application Priority Data

May 10, 1999 (JP) ............................................. 11-129307
May 10, 2000 (WO) ................................. PCT/JP00/02987

(51) Int. Cl.[7] ............................................. G06F 19/00
(52) U.S. Cl. ..................... 700/245; 700/31; 700/248; 700/258; 700/259; 318/568.1; 318/568.11; 318/568.12; 318/565; 318/569; 901/1; 901/15; 901/49; 704/207; 704/209; 704/270; 348/121
(58) Field of Search ....................... 700/245, 31, 259, 700/248, 258; 318/568.1, 568.2, 568.11, 568.12, 569, 16, 565; 901/1, 15, 47; 704/209, 207, 270; 348/121

(56) References Cited

U.S. PATENT DOCUMENTS

| | | | | |
|---|---|---|---|---|
| 4,657,104 A | * | 4/1987 | Holland | 180/211 |
| 5,465,525 A | | 11/1995 | Mifune et al. | 43/132.1 |
| 5,903,988 A | | 5/1999 | Tochizawa et al. | 37/348 |
| 5,963,712 A | * | 10/1999 | Fujita et al. | 318/568.12 |
| 6,038,493 A | * | 3/2000 | Tow | 700/259 |
| 6,058,385 A | * | 5/2000 | Koza et al. | 706/13 |
| 6,134,580 A | | 10/2000 | Tahara et al. | 709/202 |
| 6,234,902 B1 | | 5/2001 | Hazama | 463/43 |
| 6,275,773 B1 | * | 8/2001 | Lemelson et al. | 340/436 |
| 6,282,460 B2 | | 8/2001 | Gilliland et al. | 700/255 |
| 6,321,140 B1 | * | 11/2001 | Fujita et al. | 250/253 |

FOREIGN PATENT DOCUMENTS

| | | |
|---|---|---|
| JP | 7-104778 | 4/1995 |
| JP | 10-289006 | 10/1998 |

OTHER PUBLICATIONS

Breazeal et al., Infant–like social interactions between a robot and a human caregiver, 1998, Internet, p. 1–p. 44.*
Hara et al., Real–time Facial Interaction between Human and 3D Face Robot Agen, 1996, Internet/IEEE, pp. 401–409.*
"Interactive Pet Robot with Emotion Model", Toshihiro Tashima et al., vol. 1, 1998, pp. 11 and 12.
"Proceedings of the 6th Sony Research Forum", Masahiro Fujita et al., Nov. 27, 1996, pp. 234 to 239.
"Proceedings of the Second International Conference on Autonomous Agents", Masahiro Fujita et al., May 9–13, 1998, pp. 54 to 61.

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer; Gordon Kessler

(57) ABSTRACT

With a robot and a control method for it, information is read in from the outside, based on which a particular object is detected, and it is judged upon detecting the object whether or not the object satisfies given conditions, based on the judgment results of which a robot generates predetermined actions. Thus, a robot can be realized that acts naturally like a living thing. Consequently, its entertaining quality for human beings can be increased greatly.

8 Claims, 11 Drawing Sheets

| node 100 | NAME OF INPUT EVENT | NAME OF DATA | RANGE OF DATA | A | B | C | D | n |
|---|---|---|---|---|---|---|---|---|
| | | | | node 120 | node120 | node 1000 | | node 600 |
| | | | | ACTION 1 | ACTION 2 | ACTION 3 | | ACTION 4 |
| 1 | BALL | SIZE | 0, 1000 | 30% | | | | |
| 2 | PAT | | | | 40% | | | |
| 3 | HIT | | | | | 20% | | |
| 4 | SOUND | | | | | | | |
| 5 | OBSTACLE | DISTANCE | 0, 100 | | | | | |
| 6 | | JOY | 50, 100 | | | | | 50% |
| 7 | | SUPRISE | 50, 100 | | | | | |
| 8 | | SADNESS | 50, 100 | | | | | |

Person A's Table of Feeling (35A)
- INTENSITY OF FRIENDLINESS ...30
- INTENSITY OF DISLIKE ...20
- INTENSITY OF FEAR ...30
- ...

Person B's Table of Feeling (35B)
- INTENSITY OF FRIENDLINESS ...10
- INTENSITY OF DISLIKE ...40
- INTENSITY OF FEAR ...30
- ...

Person C's Table of Feeling (35C)
- INTENSITY OF FRIENDLINESS ...40
- INTENSITY OF DISLIKE ...10
- INTENSITY OF FEAR ...20
- ...

Person J's Table of Feeling (35J)
- INTENSITY OF FRIENDLINESS ...50
- INTENSITY OF DISLIKE ...10
- INTENSITY OF FEAR ...10
- ...

ROBOT AND CONTROL METHOD FOR ENTERTAINMENT

CROSS REFERENCE TO RELATED APPLICATIONS

This application is a continuation of application Ser. No. 09/743,301, filed Apr. 9, 2001, now abandoned.

TECHNICAL FIELD

The present invention relates to a robot and a control method for it, and is suitably applied to a pet robot.

BACKGROUND OF THE INVENTION

Of late, a four legged pet robot, which acts in accordance to directions from a user and surroundings, has been introduced and developed by this patent applicant. It is in the form of a dog or cat kept by an ordinary family and so designed as to take a lie-down posture upon receiving the 'LIE-DOWN' directions from the user, or to proffer its hand when the user extends his hand toward it.

However, if such a pet robot could behave more naturally like a living thing, the user may get a bigger sense of affinity and satisfaction. Therefore the entertaining quality of the pet robot will be substantially enhanced.

DISCLOSURE OF THE INVENTION

The present invention has been done considering this point and is intended to introduce a robot and a control method for it, which can increase the entertaining nature substantially.

In order to achieve this objective, a robot embodying the present invention comprises an external information read-in means for read in information from the outside, a detecting means for detecting a particular object based on the read-in information, a judging means for judging whether or not a detected object satisfies given conditions when it has been detected by the detecting means, and an action generation means for generating a corresponding action based on the judgment result obtained by the judging means. As a result, with this robot, more natural actions as a living thing does can be achieved.

Furthermore, a robot embodying the present invention is provided with three steps; 1) the step wherein external information is read in, based on which a particular object is detected, 2) another step wherein the detected object is judged whether or not it satisfies given conditions when it has been detected, and 3) yet another step wherein the robot generates a given action based on the judgment results. As a result, with the control method of this robot, more natural actions as a living thing does can be achieved by way of a robot.

BRIEF DESCRIPTION OF DRAWINGS

FIG. 5 is a conceptual diagram of the condition transition.

FIG. 6 is a schematic diagram of the emotion tables.

BEST MODE FOR CARRYING OUT THE INVENTION

Figure 1:
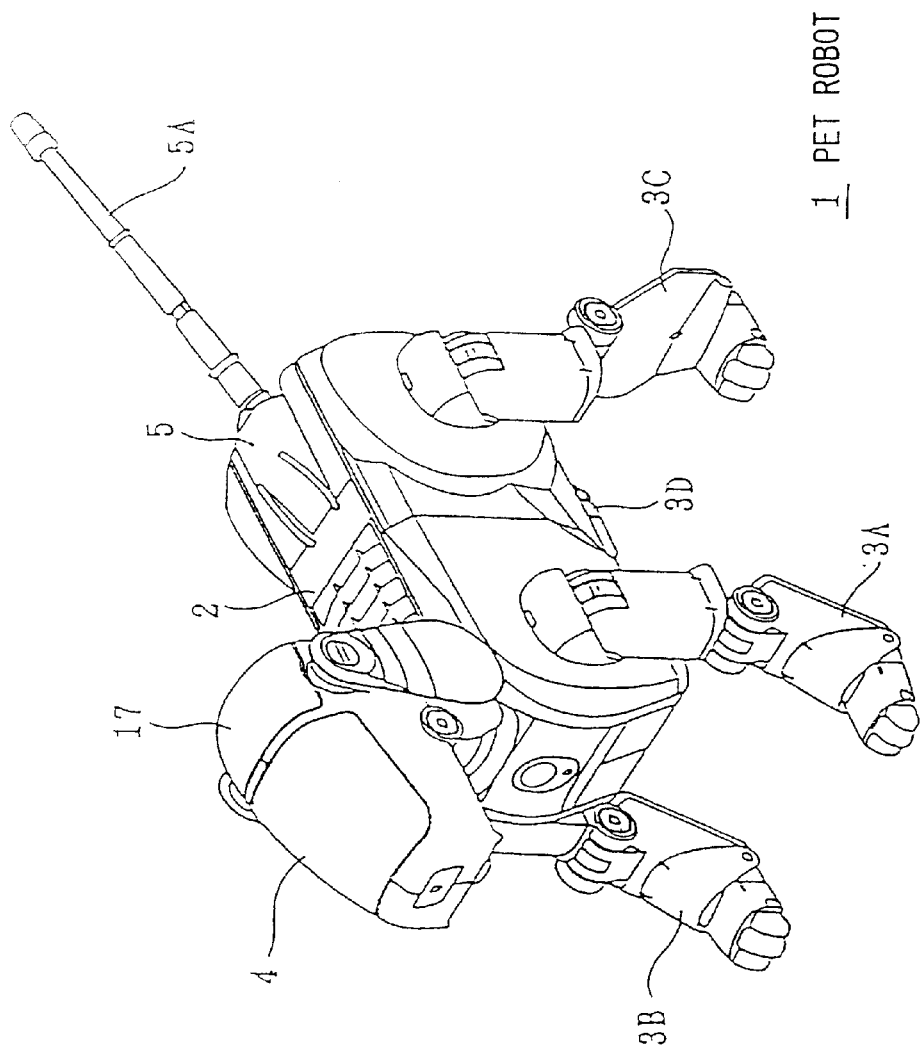
FIG. 1 is a perspective view showing the external configuration of a robot for entertainment, embodying the present invention.

A mode of carrying out the present invention is described in detail, referring to the drawings

(1) The Configuration of a Pet Robot Embodying the Present Invention

In FIG. 1, 1 is a pet robot in whole in the present embodiment, with a body unit 2, to which each of leg units 3A~3D is attached at the left and right side of the front and rear part as well as a head unit 4 and a tail unit 5 at the front and rear end of the body unit 2 respectively.

Figure 2:
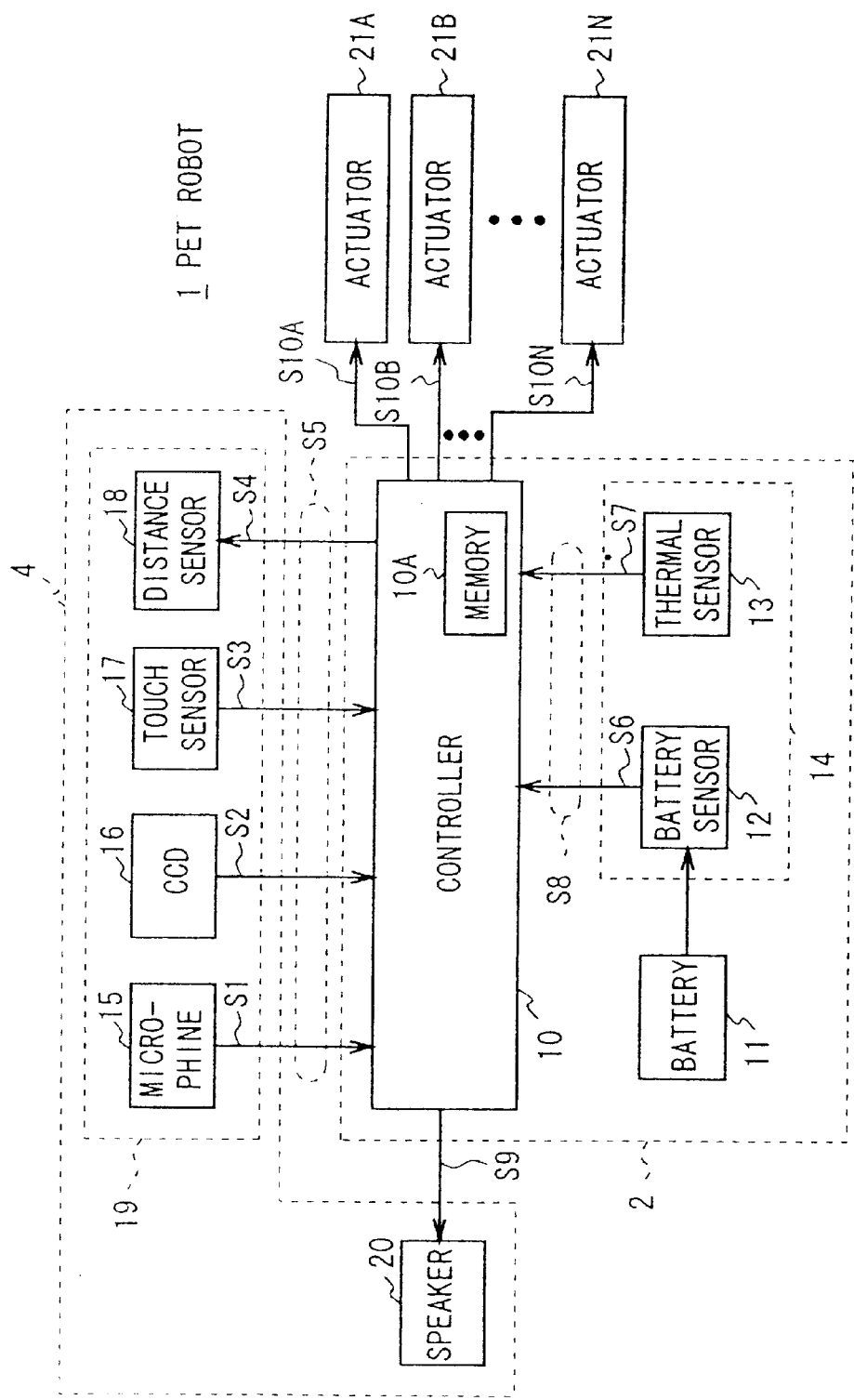
FIG. 2 is a block diagram showing the circuit configuration of a robot for entertainment, embodying the present invention.

In this instance, as shown in FIG. 2, the body unit 2 comprises a controller 10 for controlling the whole operation of the pet robot 1, a battery 11 or power source for the pet robot 1, an internal sensor component 14 consisting of a battery sensor 12 and a thermal sensor 13.

Also, the head unit 4 comprises a microphone 15 working as the 'ear' of the pet robot 1, a CCD (Charge Coupled Device) camera 16 functioning as the 'eye', and an external sensor 19 consisting of a touch sensor 17 and a distance sensor 18, which is placed on the upper part of the head unit 4 as shown in FIG. 1, and a speaker 20 working as the 'mouth', all arranged in place.

Furthermore, an actuator 21A~21N is placed respectively at the joint of each leg unit 3A~3D, at the linkage point of each leg unit 3A~3D and the body unit 2, at the linkage point of the head unit 4 and the body unit 2, as well as at the linkage point of the tail unit 5 and the body unit 2.

The microphone 15 of the external sensor collects external sounds and feeds an audio signal S1 obtained as a result to the controller 10. The CCD camera 16 photographs the surroundings and feeds an image signal S2 to the controller 10.

Furthermore, the touch sensor 17 detects a pressure generated upon receiving a physical action such as 'Stroke' or 'pat' by the user, and the result of which is fed to the controller 10 as a pressure detection signal S3. The distance sensor 18 measures the distance to an object ahead, and the result of which is also fed to the controller 10 as a distance measurement signal 4.

Thus the external sensor 19 generates an external information signal S5 consisting of the audio signal S1, image signal S2, pressure detection signal S3 and distance measurement signal S4 generated based on the information outside the pet robot 1, which (the external information signal S5) is fed to the controller 10.

Meanwhile, the battery sensor 12 of the internal sensor 14 detects the residual charge of the battery 11, and the result of which is fed to the controller 10 as a battery residue detection signal S6. The thermal sensor 13 detects a temperature inside the pet robot 1, and the result of which is fed to the controller 10 as a thermal detection signal S7.

Thus the internal sensor 14 generates an internal information signal S8 consisting of a battery residue detection signal S6 and thermal detection signal S7 generated based on the information obtained inside the pet robot 1, which (the internal information signal S8) is fed to the controller 10.

The controller 10 judges the surroundings and its own condition, and if there are directions or actions from the user, based on the external information signal S5 fed from the external sensor 19 and the internal information signal S8 fed from the internal sensor 14.

Furthermore, the controller 10 determines a subsequent action based on the result of judgment and the control program stored in the memory 10. Then, actuators 21A~21N are driven based on the above result to perform such actions as making the head unit 4 swing up and down, left to right, the tail 5A of the tail unit 5 wag and the leg units 3A~3D walk.

The controller 10 feeds an audio signal 9 to the speaker 20 when necessary in the process, and outputs a voice corresponding to the audio signal 9. Besides the controller 10 makes an LED (Light Emitting Diode, not shown in figure)) turn on or off, or blink, which is placed at the position of the 'eye' of the pet robot 1.

Thus the pet robot is designed to be able to act autonomously based on the surroundings, its own condition and directions and actions from the user.

(2) What the Controller 10 Processes

Now, explanations is given on what the controller 10 processes concretely, relative to action generation of the pet robot 1.

Figure 3:
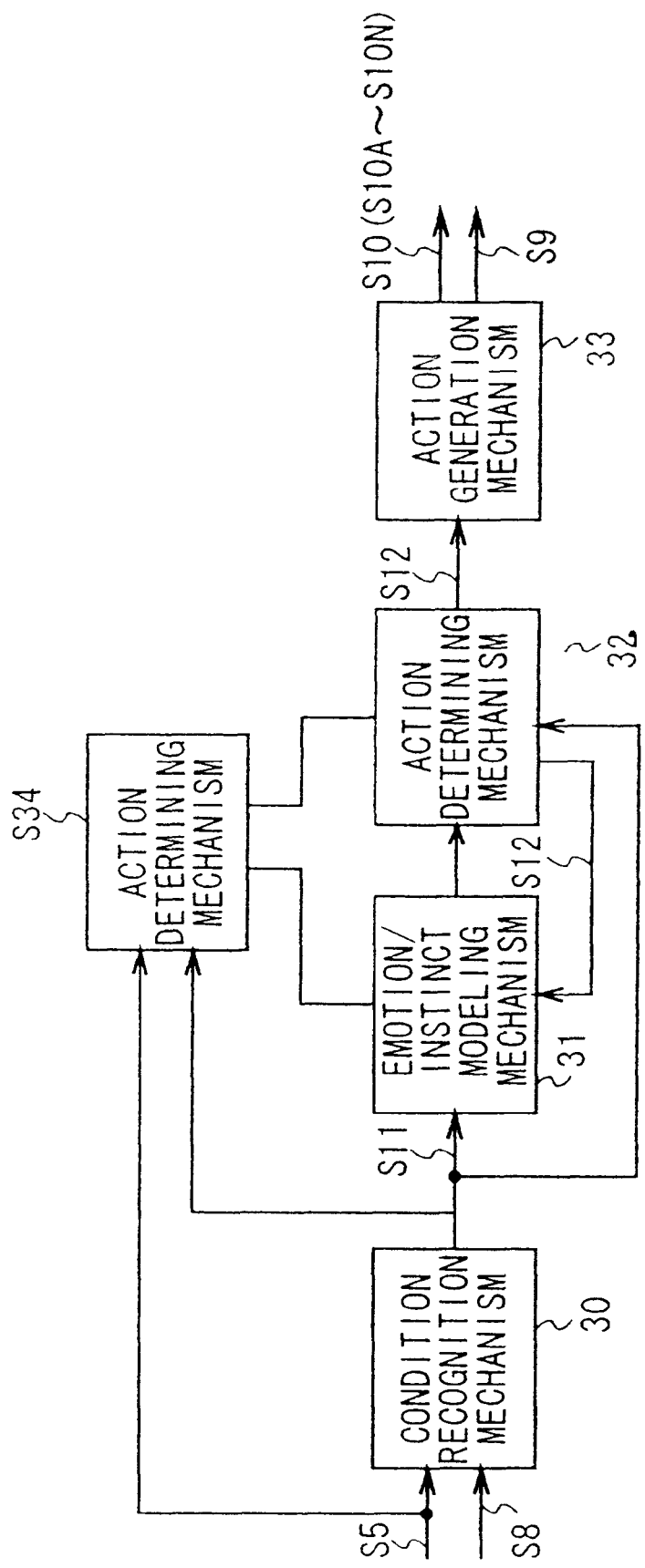
FIG. 3 is a block diagram for use in explaining the processes of the controller regarding action generation.

As shown in FIG. 3, what the controller 10 processes basically, relative to action generation of the pet robot 1, can be divided into the following in terms of functions; a) a condition recognition mechanism 30 which recognizes external and internal conditions; b) an emotion/instinct modeling mechanism 31, and c) an action determining mechanism 32 which determines a subsequent action based on a recognition result obtained by the condition recognition mechanism 30; d) an action generation mechanism 33 which actually makes the pet robot 1 act based on a decision made by the action determining mechanism 32.

Detailed description will be given hereunder on the condition recognition mechanism 30, emotion/instinct modeling mechanism 31, action determining mechanism 32, and the action generation mechanism 33.

(2-1) Configuration of the Condition Recognition Mechanism 30

The condition recognition mechanism 30 recognizes a particular condition based on an external information signal S5 fed from the external sensor 18 (FIG. 2) and an internal information signal S8 fed from the internal sensor 14 (FIG. 2), the result of which is conveyed to the emotion/instinct modeling mechanism 31 and the action determining mechanism 32.

In practice the condition recognition mechanism 30 constantly watches for an image signal S2 (FIG. 2) coming from the CCD camera 8 (FIG. 2) of the external sensor 19, and if and when, a 'red, round thing' or a 'perpendicular plane', for example, has been detected in an image produced based on the image signal S2, it is judged that 'There is a ball.' or that 'There is a wall.', and the result recognized is conveyed to the emotion/instinct modeling mechanism 31 and the action decision-making mechanism 32.

Also, the condition recognition mechanism 30 constantly watches for an audio signal S1 (FIG. 2) coming from the microphone 15 (FIG, 2), and if and when it recognizes direction sounds such as 'Walk', 'Lie down' or 'Follow the ball' based on the audio signal S1, the result recognized is conveyed to the emotion/instinct modeling mechanism 31 and the action determining mechanism 32.

Furthermore, the condition recognition mechanism 30 constantly watches for a pressure detection signal S3 (FIG. 2) coming from the touch sensor 17 (FIG. 2), and if and when a pressure has been detected for a short period of time (e.g., less than 2 seconds) and longer than a given period of time, based on the pressure detection signal S3, it is recognized as 'Hit' (Scolded), while if and when a pressure has been detected for a longer period of time (e.g., longer than 2 seconds) and less than a given threshold value, it is recognized as 'Stroked', and the result of recognition is conveyed to the emotion/instinct modeling mechanism 31 and the action determining mechanism 32.

Yet furthermore, the condition recognition mechanism 30 constantly watches for a temperature detection signal S7 (FIG. 2) coming from the temperature sensor 13 (FIG. 2) of the internal sensor 14 (FIG., 2), and if and when a temperature greater than a given value is detected based on the temperature detection signal S7, it is recognized that 'the internal temperature has risen', and the result of recognition is conveyed to the emotion/instinct modeling mechanism 31 and the action determining mechanism 32.

(2-2) Configuration of the Emotion/instinct Mechanism 31

The emotion/instinct modeling mechanism 31 has a parameter to indicate the intensity of each of a total of six emotions: (Joy), (Grief), (Surprise), (Fear), (Dislike), and (Anger). And the emotion/instinct modeling mechanism 31 alters a parameter value of each emotion in order, based on condition recognition information S11, a particular recognition result, such as 'Hit' or 'Stroked', fed from the condition recognition mechanism 30, and action determining information S12 indicating a determined subsequent output action, supplied from the action determining mechanism 32 (to be described in detail hereinafter), and a lapse of time.

Concretely, the parameter value E(t+1) of an emotion to occur in the next period is calculated in a given period at the emotion/instinct modeling mechanism 31 using the following expression:

$$E(t+1)=E(t)+K_e \times \Delta E(t) \quad (1)$$

where, $\Delta E$ (t) is a variation of a particular emotion calculated using a given operation expression based on an extent (preset) of a recognition result based on the condition recognition information S11 and an output action based on action determining information S12 working on the particular emotion, and based on an extent of a restraint and an impetus received from other emotions, and a lapse of time;

E (t) is the parameter value of a current emotion;

$K_e$ is a coefficient indicating a ratio for varying the emotion based on a recognition result and other factors.

Thus, the emotion/instinct modeling mechanism 31 alters the parameter value of the emotion by replacing the parameter E(t) of the current emotion with the above operation result.

It should be noted that it is predetermined that parameters of what emotions should be altered according to each recognition result or output action. For example, given a recognition result of 'Hit', the parameter value of emotion 'Angry' increases while that of emotion 'joy' decreases. Another example: Given a recognition result 'Stroked', the parameter value of emotion 'joy' increases while that of emotion 'Grief' decreases.

Likewise, the emotion/instinct modeling mechanism 31 has a parameter to show the intensity of each of four (4) desires, i.e., 'desire for moving', 'desire for affection, 'desire for appetite', and 'curiosity', which are all independent of each other. And the emotion/instinct mechanism 31 alters the values of these desires in order, based on a recognition result conveyed from the condition recognition mechanism 30, lapse of time, and a notice from the action determining mechanism 32.

Concretely, as to 'desire for moving', 'desire for affection' 'and 'curiosity', the value of a parameter I(K+1) of a desire to occur in the next period is calculated at the emotion/instinct modeling mechanism 31, using the following expression:

$$I(k+1)=I(k)+K_1 \times \Delta I(k) \qquad (2)$$

where, $\Delta I(k)$ is a variation quantity of a particular desire calculated using a predetermined operation expression based on an output action of the pet robot 1, a lapse of time, and a recognition result;

I(k) is the value of a parameter of the desire obtained as a result of a subtraction;

$k_1$ is a coefficient indicating the intensity of the desire. Therefore, the parameter value of a particular desire is altered in a way that the current parameter value I(k) of the desire is replaced with the above operation result.

It should be noted that it is predetermined what parameter of emotion should be varied against an output action or a recognition result. For example, if and when notified from the action determining mechanism 32 that some action has taken place, the parameter value of 'desire for moving' decreases.

Regarding the 'desire for appetite', the emotion/instinct modeling mechanism 31 calculates a parameter value I(k+1) of 'desire for appetite', using the following expression:

$$I(k)=100-B_L \qquad (3)$$

where, $B_L$ is the residual charge of the battery based on a battery residue detection signal S6 (FIG. 2) fed through the condition recognition mechanism 30. Thus, the parameter value of the 'desire for appetite' is altered in a way that the current parameter value I(k) of the desire is replaced with the above operation result.

In this mode of carrying out the present invention the parameter value of each emotion or desire is regulated so as to vary in a range of from 0 to 100. Also, the coefficients $k_e$ and $k_1$ are set individually for each emotion and desire.

(2-3) Configuration of the Action Determining Mechanism 32

The action determining mechanism 32 determines a subsequent action based on the condition recognition information S1 supplied from the condition recognition mechanism 30, a parameter value of each emotion and desire at the emotion/instinct modeling mechanism 31, action models stored in the memory 10A in advance, and a lapse of time, and it is putout at the emotion/ instinct modeling mechanism 31 and the action generation mechanism 33 as action determining information 12.

In this instance, the action determining mechanism 32 utilizes an algorithm called 'probability automaton' as a means to determine a subsequent action.

Figure 4:
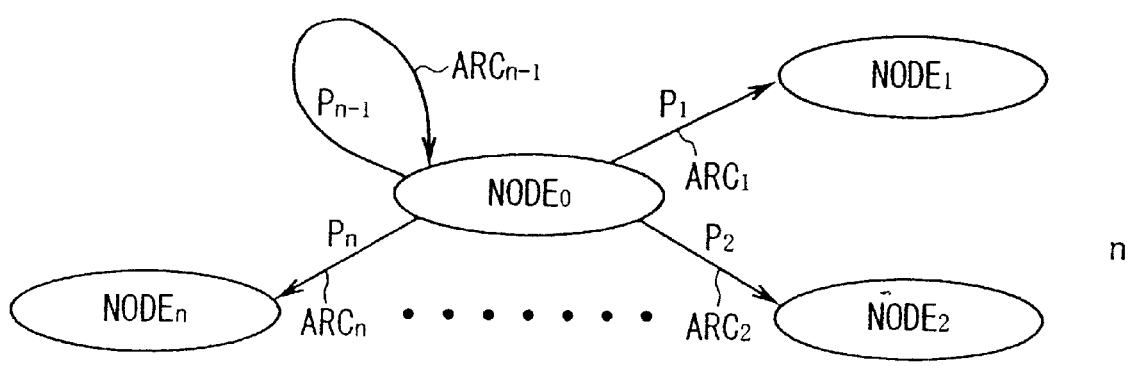
FIG. 4 is a schematic diagram of the probability automaton.

With this algorithm, as shown in FIG. 4, a decision is made upon whether the current $NODE_0$ (condition) should remain where it is or it should transit to one of the other $NODE_0 \sim NODE_n$, with probability based on a transition probability $P_0 \sim P_n$ set to $ARC_0 \sim ARC_n$ connecting each $NODE_0 \sim NODE_n$.

More concretely a condition transition table 40 as shown in FIG. 5, is stored for each $NODE_0 \sim NODE_n$ in the memory 10 as an action model so that the action determining mechanism 32 can make a decision on a subsequent action based on this condition transition table 40.

In this condition transition table 40, input events (recognition results at the condition recognition mechanism 30) or transition conditions at the current $NODE_0 \sim NODE_n$ are enumerated on the (Input Event) line with priority, and further conditions to the above transition conditions are defined on the column corresponding to the line of the (Name of Data) and (Range of Data).

Accordingly, with a $NODE_{100}$ defined in the condition transition table 40 per FIG. 5, the conditions for the current node to remain where it is or to transmit to another node are: in case a recognition result that (A ball has been detected) is given, that very existence and the fact that the size of the ball is within the range of from 0 to 1000 (0, 1000); and in case a recognition result that (An obstacle has been detected) is given, this recognition result itself and the fact that the distance to the obstacle is within the range of from 0 to 1000 (0, 1000).

Also, even if there is no input of a recognition result at $NODE_{100}$, if, of the parameter values of each emotion or desire at the emotion/instinct modeling mechanism 31, to which the action determining mechanism 32 periodically refers, a parameter value of any of emotions 'joy', 'Surprise, or 'Grief' is within a range of from 50 to 100 (50, 100), the current node may remain where it is or transit to another node.

Furthermore, in the condition transition table 40, the names of nodes which can transmit from the $NODE_0 \sim NODE_n$ to the row (Node to Follow) are enumerated in the column of (Transition Probability to Other Nodes). Simultaneously a transition probability to the then $NODE_0 \sim NODE_n$ available when all the conditions defined on each line of (Name of Input Event), (Value of Data), and (Range of Data) are met, is described on the line of the then $NODE_0 \sim NODE_n$ in the column (Transition Probability to Another Node). And an action or operation output at this moment is described on the line (Output Action). The sum of the transition probability on each line in the column (Transition Probability to Another Node) should be 50%.

Accordingly, at the $NODE_{100}$ in this example, if, for example, a recognition result that (a ball has been detected (Ball)) and that the (Size) is in the range of (from 0 to 1000 (0, 1000) are given), it can transmit to $NODE_{120}$ (node 120) with a probability of 30%, and an action or operation of (Action 1) is output at this moment.

And this action model is configured in a way that a number of $NODE_0 \sim NODE_n$ described as the Condition Transition Table 40 are linked together.

Thus, when condition recognition information S11 is supplied from the condition recognition mechanism 30 or when a given lapse of time expires since the last action was discovered, the action determining mechanism 32 determines an subsequent action or operation (an action or operation described on the [Output Action] line) with probability using the Condition Transition Table 40 of corresponding $NODE_0 \sim NODE_n$ of the action models stored in the memory 10A, and the decision result is output at the emotion/instinct modeling mechanism 31 and the action generation mechanism 33 as action determining information S12.

(2-3) Processing of the Action Generation Mechanism 33

Then, the action generation mechanism 33 generates a control signal S10A~S10N for each actuator 21A~21N needed based on the action plan formed in the preceding process. Then, the actuators 21A~21N required are driven and controlled based on these control signals S10A~S10N to make the pet robot 1 carry out an action determined by the action determining mechanism 32.

Also, when action determining information D2 such as 'Bark' or 'Turn on the LED for the eye' is fed from the action determining mechanism 32, the action generation mechanism 33 outputs a voice based on a voice signal S9 by feeding said predetermined voice signal S9 to the speaker 20, or makes the LED blink by feeding or ceasing to feed a driving voltage to said LED located where an eye is supposed to be.

As described above, the controller 10 controls each actuator 21A~21N and a voice output so that the pet robot 1 can act autonomously based on external information signal S5 supplied from the external sensor 19 and internal information signal S8 supplied from the internal sensor 14.

(2-4) Processing of the Action Control Mechanism 34

In addition to the mechanisms explained so far, the pet robot 1 has an action control mechanism 34, another function relating to action generation. Condition recognition information 11 and an external information signal S5 are fed to this action control mechanism 34 from the condition recognition mechanism 30 and the external sensor 19 respectively.

The action control mechanism 34 generates the pattern of a person's face (which is hereinafter referred to as the face pattern) based on an image signal S2 fed from the CCD camera 16 when it receives the condition recognition information S11 that 'there exists a person' from the condition recognition mechanism 30, and this face pattern is stored in the memory 10A.

At this moment the action control mechanism 34 compares the face pattern to be entered into the memory 10A with each data of face patterns previously stored in the memory 10A and only a few face patterns which appear mostly frequently are retained in the memory 10A.

Also, the action control mechanism 34 generates an emotion table 35 (35A~35J) consisting of counter tables for counting, for example, the intensity of 'Friendliness' or 'Dislike' of a particular person, comparing his face pattern with each face pattern stored in the memory 10A as shown in FIG. 6, and this emotion table 35 is stored into the memory 10A.

Then the action control mechanism 34 varies in order the count value of 'Friendliness' or 'Dislike' corresponding to the emotion table 35 of that person, according to actions such as 'Hit' or 'Stroke' performed by the person whose face pattern data is stored in memory 10A.

For instance, the action control mechanism 34 works in a way that, given the condition recognition information S11 of the previously appointed favorable actions or calls such as 'Praised', 'Stroked', 'Charged', or 'Played together' in a condition where it is recognized that there is a person nearby whose face resembles that of any face based on the face patterns stored in the memory 10, the count value for the intensity of 'Friendliness' on the emotion table 35 of the recognized face pattern increases by a preset quantity, while the count value for the intensity of 'Dislike' decreases by a preset quantity.

The increase in this instance is preset depending on the content of an action or a call, for example, (1) for 'Praised' or 'Stroked', and (2) for 'charged' or 'Played together', according to the content of an action or a call.

Likewise, the action control mechanism 34 works in a way that, given the condition recognition information S11 of previously appointed ill-intentioned actions such as 'Scolded', 'Hit', 'Request for charging ignored', or 'Request for playing together ignored' in a condition where it is recognized that there is a person nearby whose face resembles that of any face based on the face patterns stored in the memory 10, the count value for the intensity of 'Dislike' on the emotion table 35 of the recognized face pattern increases by a preset quantity, while the count value for the intensity of 'Friendliness' decreases by a preset quantity.

In this instance, too, an increase is preset according to the content of an action or a call, for example, (1) for 'Scoled', or 'Hit', and (2) for 'Request for charging ignored', or 'Request for playing together ignored' according to the content of an action or a call.

Thus, the action control mechanism 34 counts the value of the intensity of 'Friendliness' or 'Dislike' for a few persons who appear most frequently using the emotion table 35.

Figure 7:
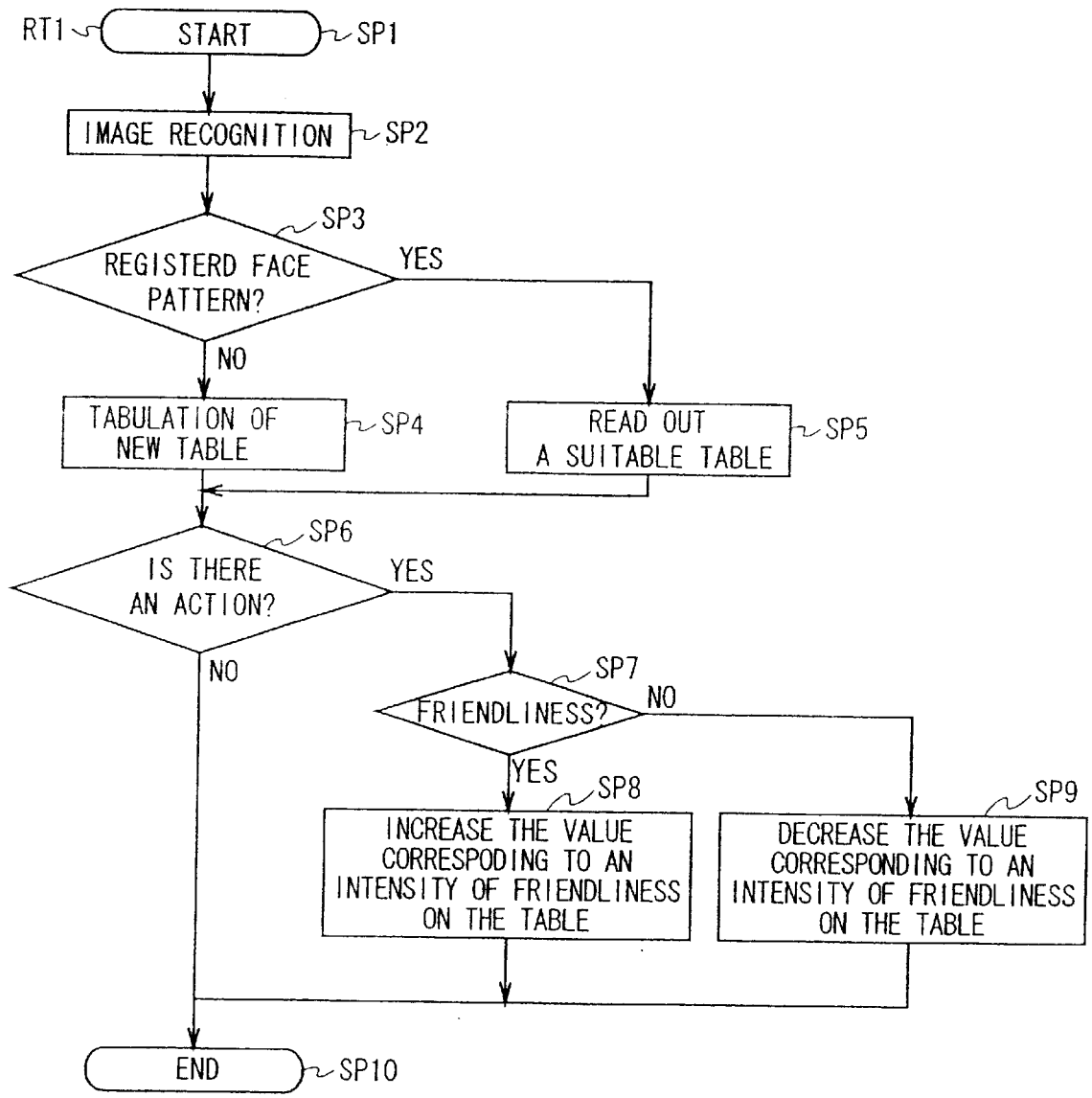
FIG. 7 is a flowchart showing the emotion table making and alteration process procedure.

The action control mechanism 34 makes or alters such an emotion table 35 at this moment, according to the emotion table formation/alteration process procedure RT1 as shown in FIG. 7.

That is, the action control mechanism 34, given a recognition result that 'There exists a person nearby', starts the emotion table formation/alteration process procedure RT1 at the step SP1 and proceeds to the next step SP2 to recognize the face pattern of an object based on an image signal S2 supplied from the CCD camera 16.

Subsequently the action control mechanism 34 proceeds to the next step SP3, where the face pattern of the object recognized at the step SP2 is compared with the face pattern of each face pattern data stored in the memory 10 and judged whether or not there exists an identical face pattern.

If a negative result is obtained at the step SP3, the action control mechanism 34 proceeds to the step SP4, where an emotion table 35 is made for the new face pattern (based on the newly-made emotion table 35). Then this table 35 and the face pattern corresponding to it, are stored in the memory 10 in a way that they replace the face pattern and emotion table 35 of a person who appears least frequently of 10 persons stored in the memory 10 who appear most frequently, and then the action control mechanism 34 proceeds to the step SP6. Simultaneously the action control mechanism 34 sets the count value of the intensity of 'Friendliness' or 'Dislike' on the emotion table 35 to a predetermined initial value respectively.

To the contrary, If an affirmative result is obtained at the step SP3, the action control mechanism 34 proceeds to the step SP5, and after retrieving a corresponding table 35, it proceeds to the step SP6.

The action control mechanism 34 judges at this step SP6 whether or not there exists a call such as 'Praise' or 'Scold', or an action such as 'Stroke' or 'Hit', and if a negative result is obtained, proceeds to the step SP10 and terminates this emotion table making/alteration process procedure RT1.

To the contrary, if an affirmative result is obtained at the step SP6, the action control mechanism 34 proceeds to the step SP7 and judges whether or not the result is a predetermined favorable action such as 'Praise' or 'Stroke'.

If an affirmative result is obtained at this step SP7, the action control mechanism 34 proceeds to the step SP8, and increases the value of the intensity of 'Friendliness' on the new emotion table 35 made at the step SP4 or the value on the emotion table 35 retrieved at the step SP5 by as much value as corresponding to an action exerted by that person, and at the same time decreases the value of 'Dislike'by as much. Subsequently the action control mechanism 34 proceeds to the step SP10 and terminates this emotion table making/alteration process procedure RT1.

To the contrary, If a negative result is obtained at this step SP7, the action control mechanism 34 proceeds to the step SP9 and decreases the value of the intensity of 'Friendliness' on the new emotion table 35 made at the step SP4 or the value on the emotion table 35 retrieved at the step SP5 by as much value as corresponding to an action exerted by that person, and at the same time increases the value of 'Dislike' by as much. Subsequently the action control mechanism 34 proceeds to the step SP10 and terminates this emotion table making/alteration process procedure RT1.

Thus, the action control mechanism 34 forms the emotion table 35, and at the same time alters the emotion table 35 in order according to an action made by that person.

Figure 8:
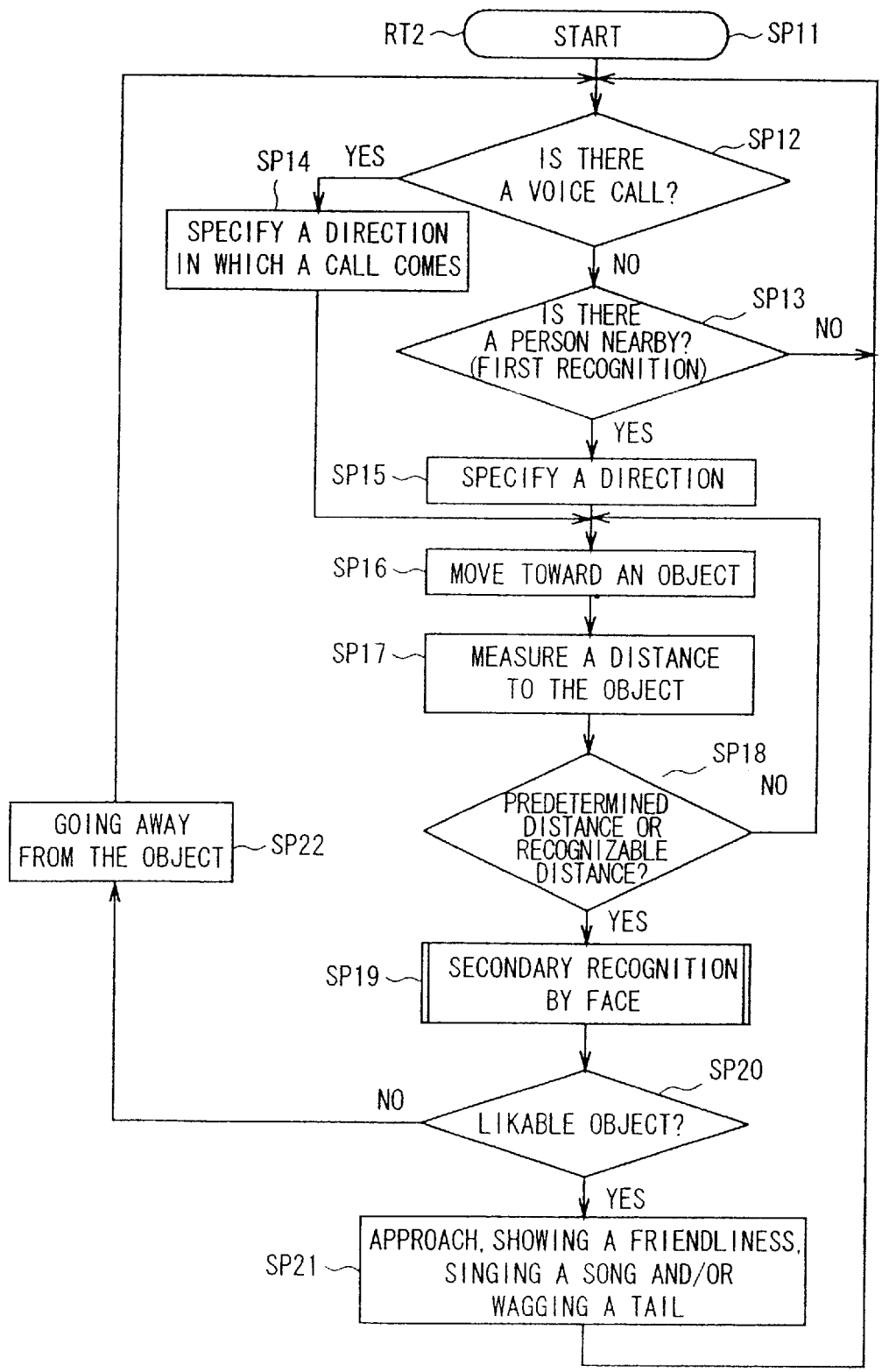
FIG. 8 is a flowchart showing the action control process procedure.

Also, the action control mechanism 34 controls the action generation of the pet robot 1 according to an action control process procedure RT2 as shown in FIG. 8, in parallel with the above processing.

That is, the action control mechanism 34, immediately after the power is turned on, starts the action control process procedure RT2 at the step SP11, and judges at the subsequent steps SP12 and SP13 in order whether or not there exists a voice call, or whether or not there exists a person nearby based on the condition recognition information S11 supplied from the condition recognition mechanism 30. The action control mechanism 34 repeats an SP12-SP13-SP12 loop until an affirmative result is obtained at either SP12 or SP13.

And, when and if an affirmative result is obtained at the step SP12 in due course, the action control mechanism 34 proceeds to the step SP14 and determines the direction in which a voice originates, and then proceeds to the step SP16. Also, upon obtaining an affirmative result at the step SP13 the action control mechanism 34 proceeds to the step SP15 and determines the direction in which a person is recognized by the condition recognition mechanism 30, and then proceeds to the step SP16.

Next, the action control mechanism 34 controls the action determining mechanism 32 at the step SP16 so that the pet robot 1 moves toward a person who originates a call or a person recognized by the condition recognition mechanism 30. (Such a person is hereinafter referred to as 'Object'.)

In practice such a control can be accomplished by assigning 100% for a transition probability $P_1$ to $NODE_1$ (e.g., 'Walk') corresponding to the probability automation shown in FIG. 4, and 0% for a transition probability to another $NODE_2 \sim NODE_n$.

The action control mechanism 34 proceeds to the step SP7 and measures the distance to an object based on a distance measuring signal S14 supplied from a distance sensor 18, then proceeds to the step SP18, where it is judged if the distance measured comes to be equal to the preset distance, or whether or not the face of the object comes to be within an range in which it is recognizable.

If a negative result is obtained at the step SP18, the action control mechanism 34 returns to the step SP16 and repeats an SP16-SP17-SP18-SP16 loop until an affirmative result is obtained at the step SP18.

Figure 9:
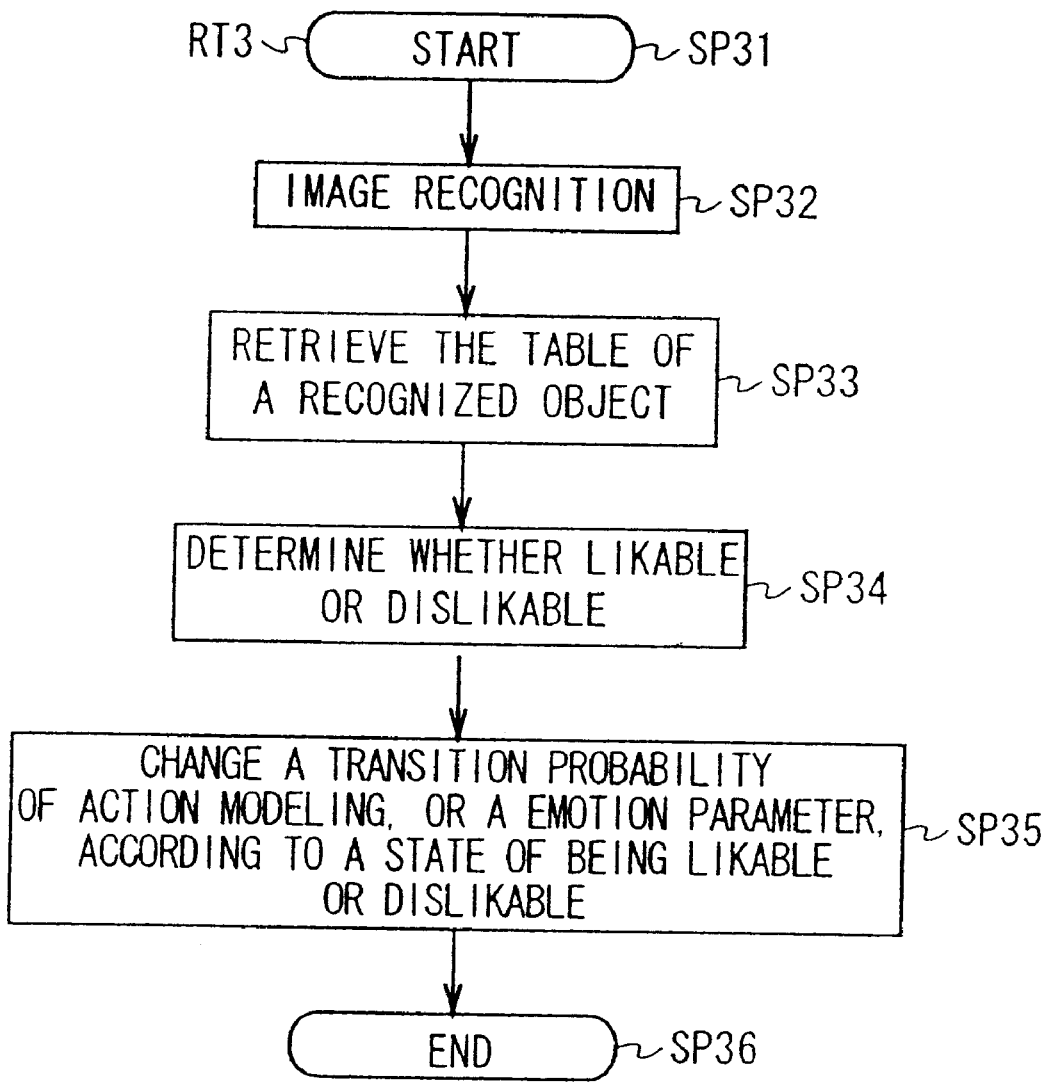
FIG. 9 is a flowchart showing the action determining process procedure.

And, the action control mechanism 34 proceeds to the step SP19 upon obtaining an affirmative result at the step SP18 and executes the action determining process procedure RT3 shown in FIG. 9.

In practice, when the action control mechanism 34 proceeds to the step SP19 of the action control processing procedure RT2, this action determining processing procedure RT3 (FIG. 9) starts at the step SP31, and then the face pattern of an object is recognized at the following step SP32, based on the image signal S2 fed from the CCD camera 16.

Subsequently the action control mechanism 34 proceeds to the step SP33, and compares the face pattern of the object recognized at the step SP32 with a face pattern based on each face pattern data stored in the memory 10A.

If the face pattern of the object coincides with a face pattern based on any face pattern data stored in the memory 10A, the action control mechanism 34 reads out the count value of the intensity of each of 'Friendliness' or 'Dislike' from a suitable emotion table 35 stored in the memory 10A.

Then, the action control mechanism 34 proceeds to the step SP34 and decides whether or not the pet robot 1 likes the object based on a value of 'Friendliness' and a value of 'Dislike'. In practice this decision is made in a way that if the count value of the intensity of 'Friendliness' is greater than or equal to that of 'Dislike', the object is judged as friendly. To the contrary, if the count value of the intensity of 'Dislike' is greater than that of 'Friendliness', the object is judged as unfavorable.

Furthermore the action control mechanism 34 proceeds to the step SP35 and alters a variation in the parameter value of the emotions and the desires retained in the emotion/instinct modeling mechanism 31 and a transition probability in a condition transition table retained in the action determining mechanism 32, based on a judgment result obtained at the step SP36

Then the action control mechanism 34, when varying the parameter value of emotion and that of desire retained in the emotion/instinct modeling mechanism 31, alters a variation in each parameter value effected depending upon how it (the pet robot 1) is 'Hit' or 'Stroked', according to the judgment result obtained.

In practice, the emotion/instinct mechanism 31 calculates a parameter value of emotion, using the following expression:

$$E(t+1)=E(t)+K_e \times \Delta E(t) \tag{1}$$

and a parameter value required is calculated, using the following expression:

$$I(k+1)=I(k)+k_1 \times \Delta I(k) \tag{2}$$

Therefore, the action control mechanism 34 can alter a variation in the parameter values obtained by means of the above expressions by varying the coefficient $K_e$ and $K_f$ in the above expressions, according to the judgment result.

Therefore, the action control mechanism 34, when a recognition result, e.g., 'Stroked' is obtained in case the object is judged as friendly, gives a large value to the coefficient $K_e$ of the expression with use of which a parameter value of an emotion 'joy' is calculated. Whereas, a small value is given to the coefficient $K_e$ of the expression with use of which a parameter value of an emotion 'angry' is calculated. In this manner a parameter value of 'joy' for a friendly object can be increased by '2', which usually increases by only '1' while the parameter value of 'angry' can be decreased by only '0.5', which usually decreases by '1'.

To the contrary, the action control mechanism 34, when a recognition result, e.g., 'Hit', is obtained in case the object is judged as unfavorable, gives a large value to the coefficent $K_e$ of the expression with use of which the parameter value of an emotion 'joy' is calculated, and gives a large value, too, to the coefficient $K_e$ of the expression with use of which the parameter value of an emotion 'angry' is calculated. In this manner the parameter value of 'joy' for an unfavorable object can be decreased by '2', which usually decreases by only '1' while the parameter value of 'angry' can be increased by '2', which usually increases by only '1'.

Meantime, if the transition probability of an action model retained in the action determining mechanism 32 is varied and if there occurs a concrete action as described above, the action control mechanism 34 alters, according to such a judgment result, a transition probability defined in the column of (Transition Probability to Another Node) in the condition transition table as shown in FIG. 5.

And, the action control mechanism 34 can alter an action or operation to be generated according to the judgment result, in a way that if the object is judged as friendly, a transition probability capable of transiting to a node where an action or operation of, e.g., 'joy' is made, increases from '50%' to '80%', whereas if the object is judged as unfavorable, a transition probability capable of transiting to a node where an operation of e.g., 'joy' is made, decreases from '50%' to '30%'.

Figure 10:
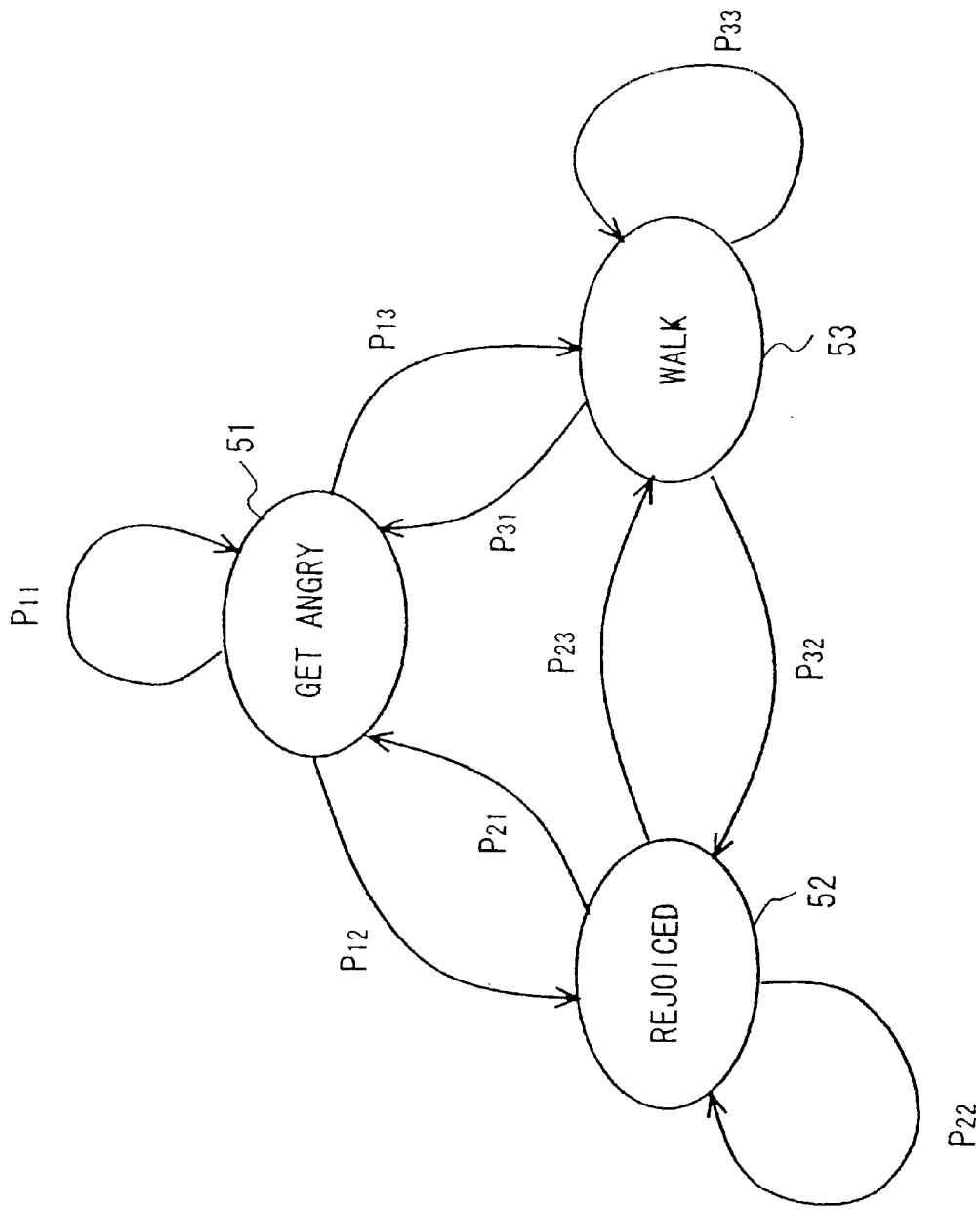
FIG. 10 is a conceptual diagram for use in describing the condition transition.

Thus, in practice, as shown in FIG. 10, the action determining mechanism 32 makes it easier to generate an action of 'Rejoiced' if the object is judged as friendly, by increasing, e.g., a transition probability $P_{12}$ to transit from 'angry' node 51 to 'Rejoiced' node 52, a transition probability$_{22}$ to transit from 'Rejoiced' node 52 to 'Rejoiced' node 52 of its own, and a transition probability $P_{32}$ to transit from 'Walk' node 53 to 'Rejoiced' node 52 respectively.

Also, the action determining mechanism 32 makes it easier to generate an action of 'Get angry' if an object is judged as unfavorable, by increasing, e.g., a transition probability $P_{11}$ to transit from 'Get angry' node 51 to 'Get angry' node 51 of its own, a transition probability$_{21}$ to transit from 'Rejoiced' node 52 to 'Get angry' node 51, and a transition probability $P_{31}$ to transit from 'Walk' node 53 to 'Get angry' node 51.

The action control mechanism 34 proceeds to the step 35 and terminates this action determining processing procedure RT13, and further proceeds to the step SP20 for the action control processing procedure RT2, the main routine.

Then, the action control mechanism 34 judges at this step SP20 whether or not the object is friendly based on the decision result obtained at the step SP19.

Concretely, if an affirmative result is obtained at this step SP20, the action control mechanism 34 proceeds to the SP21 and controls the action determining mechanism 32 so that the pet robot 1 takes an action to approach the object, showing its good temper by singing a song or wagging the tail 5A.

At this instance the action control mechanism 34 controls the action determining mechanism 32 and the action generation mechanism 33 so that the greater the difference between the intensity of 'Friendliness' and that of 'Dislike', so much the better the temper of the pet robot 1 seems to be. (For example, the wagging of the tail 5A or the speed of approaching is accelerated by varying the speed of rotation of the actuators 21A~21N.)

At this moment, the action control mechanism 34 makes it easier to generate an action or operation made by an emotion 'joy' of the pet robot 1 in a way that a variation in the parameter value of emotion and that of desire are varied according to the judgment result of whether or not the object is friendly obtained at the step 35.

To the contrary, the action control mechanism 34 proceeds to the step SP22 if a negative result is obtained at the step SP20, and controls the action determining mechanism 32 so that the pet robot 1 goes away from the object.

(3) Learning and Recognition Processing at Action Control Mechanism 34

Figure 11:
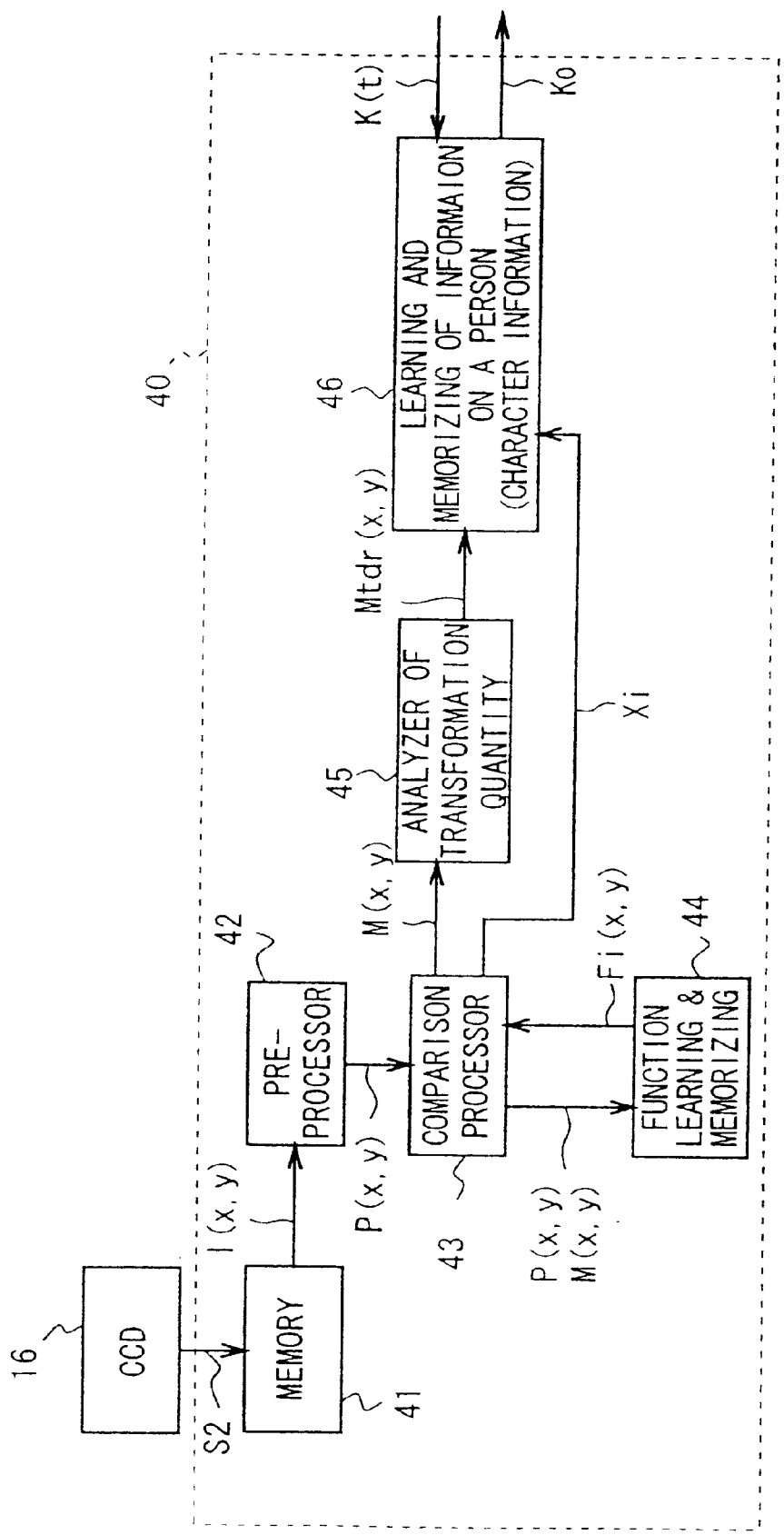
FIG. 11 is a block diagram showing the configurations of the face pattern learning and the recognition processor.

Elucidation is given on how to learn, recognize, and process face patterns at the action control mechanism 34 as is shown in FIG. 11.

With the pet robot 1, a method disclosed in the Japanese Official Bulletin TOKKAIHEI Issue NO. 6-89344 is used for the action control mechanism 34 as a means for learning, recognizing and processing face patterns. Concretely the action control mechanism 34 incorporates a face pattern learning, recognizing, and processing units 40 in it.

In this face pattern learning, recognizing, and processing units 40, the face part of the image signal S2 fed from the CCD camera 16 is quantified in e.g., 8 bits at the memory 41 comprising a RAM (Random Access Memory) and an analog/digital converter, and a face pattern data I (x, y) consisting of a quadratic brightness data obtained on an xy plane is memorized by the frame in the RAM of the memory 41.

A front processor 42 does a pre-processing like detecting, e.g., edges in the face image date I (x, y) memorized in the memory 41 and retrieves a face pattern P (x, y) as the quantity of characteristics of the face image [face image data I (x, y)], which is conveyed to a comparison processor 43.

The comparison processor 43 calculates a contribution degree $X_i$ consisting of a correlation quantity to the face pattern P (x, y) for each of the r number of functions Fi (x, y) (i=1,2, . . . , r) memorized as the basic model of the face pattern P (x, y) beforehand in a function learning memory 44.

Also, the comparison processor 43 detects a function $F_{MAX}$ (x, y) having the maximum contribution degree $X_{MAX}$ ($1 \leq MAX \leq r$), and this function $F_{MAX}$ (x, y) or the face pattern P (x, y) is transformed until the contribution degree $X_{MAX}$ of this function $F_{MAX}$ (x, y) becomes the greatest or reaches the maximum point. In this way, a transformation quantity M (x, y) composed of the difference between the function $F_{MAX}$ (x, y) and the face pattern P (x, y) is calculated.

This transformation quantity M (x, y) is fed to a function learning memory 44 and a transformation quantity analyzer 45. The face pattern P (x, y) is fed to the function learning memory 44, too.

Composed of e.g., neural networks, the function learning memory 44 memorizes the r number of functions Fi (x, y) (i=1,2, . . . , r) as the basic model of the face pattern P(x, y) as described above.

The function learning memory 44 transforms the function $F_{MAX}$ (x, y) or the face pattern P (x, y) using the transformation quantity M (x, y) supplied and alters the function $F_{MAX}$ (x, y) based on a transformed function $F_{MAX}'$ (x, y) on the xy plane and a transformed face pattern P' (x, y).

The transformation analyzer 45 analyzes the transformation quantity M (x, y) fed from the comparison processor 43 and generates a new transformation quantity Mtdr (x, y) by removing dissimilarities, at the top and bottom, left and right, in the face pattern P (x, y) in the image, a slippage due to rotations, or differences in size due to the distance and the ratio of magnification or reduction. This transformation quantity Mtdr (x, y) is fed to a character information learning memory 46.

In case the learning mode is in operation, the character information learning memory 46 stores into the internal memory (not shown in figure) the transformed quantity Mtdr (x, y) to be fed, which is related to the character information K (t) or the function of the number t(t=1, 2, . . . T; T=the number of faces of the characters) assigned to e.g., a character (face). (For example, the average value of a plurality of transformed quantities Mtdr(x,y), Mtdr'(x,y), Mtdr"(x,y) . . . of the face image of the same character t is assumed as the character information K (t)).

In other words, if the learning mode is in operation, the transformation quantity Mtdr (x, y) itself of the character outputted from the transformation quantity analyzer 45 is memorized in the character information learning memory 46 as the character information, and whenever the transformation quantity Mtdr (x, y) of the same character t is inputted later, the character information K (t) is altered based on the transformation quantity Mtdr (x, y).

Furthermore, if the recognition mode is in operation, the character information learning memory 46 calculates a transformation quantity Mtdr (x, y) to be fed from the transformation quantity analyzer 45 and e.g., an Euclidean distance to each character information K (t) memorized beforehand in the internal memory and outputs as a recognition result the number t in the character information K (t) which makes the distance the shortest.

In the face pattern learning and recognition processor 40 thus configured, the transformation quantity M (x, y) is analyzed in the transformation quantity analyzer 45, and a parallel move component, a rotational move component, and an enlargement/reduction component contained in the transformation quantity M (x, y) are removed so as to alter the standard pattern memorized in the character information learning memory 46 based on a new transformation quantity Mtdr (x, y). Therefore, a high level of the recognition ratio is accomplished.

(4) Operation and Effect of This Embodiment

With the configuration as described heretofore, the pet robot 1 memorizes not only the face patters of a few people who appear the most frequently, but also new face patterns replacing the face patterns of a few people who appear the least frequently upon obtaining new face patterns.

Also, the pet robot 1 counts the intensity of 'Friendliness' or 'Dislike', according to the history of information entered on actions or calls taken and made toward the pet robot 1 by a person, comparing that person with such a face pattern data.

The pet robot 1, when called or if a person has been detected nearby, approaches that person, performing a friendly behavior when the intensity of 'Friendliness' is larger than that of 'Dislike' or the threshold value.

The pet robot 1, however, goes away from that person if the intensity of 'Friendliness' is smaller than that of 'Dislike' or the threshold value, or if the pet robot 1 does not have that person's face pattern data in memory.

Thus, the pet robot 1 performs natural actions or operations like a living thing as if it were a real animal, and approaches a person whose degree of 'Friendliness' is high based on the history of information entered of that person's actions and calls, or goes away from a person whose degree of 'Friendliness' is low or from a person whom the pet robot does not know. Consequently the pet robot 1 is capable of giving a sense of affinity and satisfaction to the user.

With the configuration described heretofore, the pet robot 1 detects a person based on an external information signal S5 fed from the external sensor 19 and judges if the intensity of 'Friendliness' is greater or smaller than that of 'Dislike' by a given value. When the answer is 'greater', the pet robot 1 approaches that person, and goes away from that person if the answer is any other than 'greater'. Thus, the pet robot 1 is made to perform natural actions or operations like a living thing, thereby succeeding in giving a sense of affinity and satisfaction to the user. Now, a pet robot which is capable of enhancing the entertaining quality for the user, can be realized.

(5) Other Modes of Carrying Out the Present Invention

In the above mode of carrying out the present invention, elucidation is given on the case, wherein the present invention is applied to the pet robot configured as shown in FIGS. 2 and 3. However, the present invention is not limited to it, and applicable widely to robots with a variety of other configurations and control methods for them.

Again in the above mode of carrying out the present invention, elucidation is give on the case, wherein the intensity of 'Friendliness' or 'Dislike' is counted based on calls such as 'Praise' and 'Scold' and on actions such as 'Stroke' and 'Hit'. However, the present invention is not limited to it, and other calls and actions such as 'Played together' and 'Ignored' may as well be used as elements for counting the intensity of 'Friendliness' and 'Dislike'.

Furthermore, in the above mode of carrying out the present invention, elucidation is given on the case, wherein the pet robot 1 per se chooses an object (human being), of which degree of 'Friendliness' and 'Dislike' is counted, and the present invention is not limited to it, and the user may as well set an object for counting the intensity of 'Friendliness' and 'Dislike'.

Furthermore, in the above mode of carrying out present invention, elucidation is given on the case, wherein the pet robot 1 approaches the user upon being spoken to by the user by means of a voice. However, the present invention is not limited to it, and it may as well be such that the pet robot approaches the user upon being spoken to by means of an ultrasonic wave or a sound command that outputs directions expressed in sound.

Furthermore, in the above mode of carrying out the present invention, elucidation is given on the case, wherein a person nearby is detected based on an image signal S2 through the CCD camera 16. However, the present invention is not limited to it, and other means than such visual information such as an odor or environmental temperature may as well be used for detecting a person nearby.

Furthermore, in the above mode of carrying out the present invention, elucidation is given on the case, wherein the user is recognized based on the face pattern. However, the present invention is not limited to it, and other elements or features such as a 'voice', 'odor', 'environmental temperature', or 'physique', etc., too, can be utilized to detect the user, in addition to the face pattern. This can be realized by putting data on a 'voice', 'odor', 'environmental temperature', and 'physique', etc. into the pet robot 1 in advance.

Furthermore, in the above mode of carrying out the present invention, elucidation is given on the case, wherein there are only two action patterns based on the intensity of 'Friendliness' and 'Dislike'; the pet robot 1 approaches a person when the intensity of 'Friendliness' is greater than that of 'Dislike' by a given value; otherwise it goes away from the person. However, the present invention is not limited to it, and a plurality of other action patterns may be incorporated into a robot, for example, an action pattern, in which a pet robot runs away when the intensity of 'Dislike' is greater than that of 'Friendliness' by a given value.

Furthermore, in the above mode of carrying out the present invention, elucidation is given on the case, wherein an object the pet robot 1 approaches or goes away from, is a human being. However, the present invention is not limited to it, and it may as well be such that preset actions or operations are made responding to colors, sounds, physical solids, animals, or odors.

Furthermore, in the above mode of carrying out the present invention, elucidation is given on the case, wherein the external sensor 19 as an external information read-in means for reading in information from the outside, comprises the microphone 15, CCD camera 16, touch sensor 17 and distance sensor 18. However, the present invention is not limited to it, and the external sensor 19 may as well be composed of other disparate sensors in addition to them, or other disparate sensors only.

Furthermore, in the above mode of carrying out the present invention, elucidation is given on the case, wherein the only one controller 10 comprises both the detecting means for detecting a particular object (person) based on an external information signal S5 fed from the external sensor 19 and the judging means for judging whether or not an object satisfies preset conditions (that the intensity of 'Friendliness' is greater than that of 'Dislike' by a given value) when an object is detected by the detecting means. However, the present invention is not limited to it, and these detecting and judging means may as well be installed on other separate units.

Furthermore, in the above mode of carrying out the present invention, elucidation is given on the case, wherein an action generation control means for generating actions under control of the action control mechanism 34 of the controller 10 comprises the action determining mechanism 32 and the action generation mechanism 33 of the controller 10, a plurality of the actuators 21A~21N, speaker 20, and the LEDs. However, the present invention is not limited to it, and is applicable to a wide variety of other configurations.

Furthermore, in the above mode of carrying out the present invention, elucidation is given on the case, wherein the pet robot 1 takes an action to approach an object if the intensity of 'Friendliness' is greater than that of 'Dislike' by a given value, and otherwise it goes away from the object. However, the present invention is not limited to it, and it may as well be such that other actions such as 'Bark' and 'Turn on and off the light (blink)' are achieved. It this case it may as well be designed such that the greater the difference between the intensity of 'Friendliness' and that of 'Dislike', the more willfully a pet robot behaves or the more quickly it goes away.

Furthermore, in the above mode of carrying out the present invention, elucidation is given on the case, wherein it is the condition for the pet robot 1 to approaches or goes away that the intensity of 'Friendliness' is greater than that of 'Dislike' by a given value. However, the present invention is not limited to it, and a pet robot may as well be so designed as to respond to a variety of other conditions, e.g., whether or not an object is registered.

Furthermore, in the above mode of carrying out the present invention, elucidation is given on the case, wherein a count value of emotion in the emotion table 35 is altered when an action or a call is exerted. However, the present invention is not limited to it, and it may as well be such that a count value in the emotion table 35 is altered automatically as time goes by, approaching the count value initially set. In this case a sense of friendliness or dislike the pet robot 1 has toward a person with a particular face pattern is attenuated as time goes by.

Furthermore, in the above mode of carrying out the present invention, elucidation is given on the case, wherein an action pattern is determined based on a count value of the intensity of 'Friendliness' and that of 'Dislike'. However, the present invention is not limited to it, and it may as well be such that an action pattern is determined based on the count value of other emotions such as the intensity of 'Fear', 'Surprise', 'Anger', and 'Grief'.

In this case, the action control mechanism 34 divides the count values in the emotion table 35 into one group of count values for approaching an object like the intensity of 'Friendliness' and another group of count values for going away from the object. The divided count values are coordinated, based on which an action pattern is determined.

Furthermore, in the above mode of carrying out the present invention, elucidation is given on the case, wherein such behaviors as 'Get angry, 'Rejoiced', and 'Run' are used as condition transition nodes. However, the present invention is not limited to it, and it may as well be such that the transition probability is altered among these nodes with the use of other emotions such as 'Grieved' and 'Surprised', and other actions such as 'Cry' and 'Romp'.

Furthermore, in the above mode of carrying out the present invention, elucidation is given on the case, wherein the transition probabilities in action models are varied according to the intensity of 'Like or Dislike' held toward a detected person. However, the present invention is not limited to it, and it may as well be designed such that a plurality of action models are prepared, which are interchanged according to the intensity of like or dislike; separate action models are prepared for a favorable person and an unfavorable person so that action models for a favorable person, (which are so designed as to discover an action expressing a sense of 'Joy' more easily), are used for a favorable person and that action models for an unfavorable person, (which are so designed as to discover an action expressing a sense of 'Dislike' more easily), are used for an unfavorable person.

Industrial Applicability

The present invention can be applied to pet robots.

What is claimed is:

1. A robot comprising:

external information inputting means for inputting information;

detection means for selecting a particular object based on said information inputted by said external information inputting means;

judgment means for judging whether or not the object satisfies given conditions when said object is detected by said detection means; and action generating means for generating a predetermined action based on the results obtained by said judgment means, said predetermined action being selected in accordance with a transition probability automation scheme.

2. The robot according to claim 1, wherein said action generating means generates on action of approaching toward said object detected by said detection means when said object satisfies said conditions, while generating said action of walking away from said object when said object does not satisfy said conditions.

3. A robot comprising:

external information inputting means for inputting information;

detection means for selecting a particular object based on said information inputted by said external information inputting means;

judgment means for judging whether or not the object satisfies given conditions when said object is detected by said detection means; and action generating means for generating a predetermined action based on the results obtained by said judgment means;

wherein said action generating means generates said action of approaching toward said object detected by said detection means when said object satisfies said conditions, while generating said action of walking away from said object when said object does not satisfy said conditions;

said action generating means comprising:
- a surroundings recognition unit for recognizing said external surroundings based on said information inputted by said external information inputting means;
- an emotion modeling unit for storing parameter values of the intensities of emotions of at least 'Joy' and 'Dislike' and for changing said parameter values of corresponding said emotions based on said judgment results at said surroundings recognition unit;
- an action generation unit for generating said action based on the judgement results obtained at said surroundings recognition unit and said parameter values indicating the intensities of said emotions at said emotion modeling unit; and
- an altering means for altering the setting of said emotion modeling unit if necessary, based on the judgment results at said judgment unit; and wherein
    said altering means alters the setting of said emotion modeling means so that it is easier to increase said parameter value of said intensity of an emotion 'joy' if said object satisfies said conditions, while altering the setting of said emotion modeling means so that it is easier to increase said parameter value of said intensity of an emotion 'Dislike' if said object does not satisfy said conditions.

4. A robot comprising:
external information inputting means for inputting information;

detection means for selecting a particular object based on said information inputted by said external information inputting means;

judgment means for judging whether or not the object satisfies given conditions when said object is detected by said detection means; and action generating means for generating a predetermined action based on the results obtained by said judgment means;

wherein said action generating means generates said action of approaching toward said object detected by said detection means when said object satisfies said conditions, while generating said action of walking away from said object when said object does not satisfy said conditions;

said generating means comprising:
- a surroundings recognition unit for recognizing said external surroundings based on said information inputted by said external information inputting means;
- an action determining unit for generating said subsequent action with probability based on the recognition results obtained at said surroundings recognition unit;
- an action generation unit for generating said action determined by said action determining unit; and
- an altering means for altering said setting of the action determining unit as required, based on said judgment results obtained by said judgment means; wherein said altering means alters the setting of said action determining unit to increase the selection probability for said action expressing 'Joy' if said object satisfies said conditions, and to increase the selection probability for said action expressing 'Dislike' if said object does not satisfy said conditions.

5. A control method for controlling a robot comprising the steps of:
inputting external information and detecting a particular object based on said information;

making a judgment on whether or not said object satisfies given conditions when said object is detected; and making said robot perform a predetermined action based on said judgment results, said predetermined action being selected in accordance with a transition probability automation scheme.

6. The method for controlling a robot according to claim 5, wherein
said robot performs said action to approach said object if said object satisfies said conditions, and otherwise makes said action to walk away from said object if said object does not satisfy said conditions.

7. A control method for controlling a robot comprising:
inputting external information and detecting a particular object based on said information;

making a judgment on whether or not said object satisfies given conditions when said object is detected; and making said robot perform a predetermined action based on said judgment results;

wherein said robot performs said action to approach said object if said object satisfies said conditions, and otherwise makes said action to walk away from said object if said object does not satisfy said conditions;

said robot comprising:
- a surroundings recognition unit for recognizing said external surroundings based on said information inputted by an external information inputting unit;
- an emotion modeling unit for storing parameter values of the intensities of emotions of at least 'Joy' and 'Dislikes' and for changing the parameter values of corresponding ones of said emotions based on recognition results at said surroundings recognition unit; and
- an action generation unit for generating said action based on the recognition results at said surroundings recognition unit and said parameter values indicating the intensities of said emotions at said emotion modeling unit; wherein
    if said object satisfies said conditions, the setting of said emotion modeling unit is altered so as to make it easier to increase said parameter value indicating the intensity of said emotion 'Joy', while if said object does not satisfy said conditions, the setting of said emotion modeling unit is altered so as to make it easier to increase said parameter value indicating the intensity of said emotion 'Dislike'.

8. A control method for controlling a robot comprising:
inputting external information and detecting a particular object based on said information;

making a judgment on whether or not said object satisfies given conditions when said object is detected; and making said robot perform a predetermined action based on said judgment results;

wherein said robot performs said action to approach said object if said object satisfies said conditions, and otherwise makes said action to walk away from said object if said object does not satisfy said conditions;

said robot comprising:
- a surrounding recognition unit for recognizing said external surroundings based on said information inputted by external information inputting means;
- an action determining unit for determining the subsequent action with probability, based on the recognition results obtained at said surroundings recognition unit; and
- an action generation unit for generating said action determined by said action determining unit; wherein the setting of said action determining unit is altered so as to increase the selection probability of said action expressing 'joy' if said object satisfies said conditions, whereas, if said object does not satisfy said conditions, the setting of said action determining unit is altered so as to increase the selection probability of said action expressing 'Dislike'.

* * * * *